(12) United States Patent
Vanbesien et al.

(10) Patent No.: US 8,652,575 B2
(45) Date of Patent: Feb. 18, 2014

(54) INK COMPOSITIONS

(75) Inventors: Daryl W. Vanbesien, Burlington (CA); Edul N. Dalal, Webster, NY (US); Karen A. Moffat, Brantford (CA); Raymond W. Wong, Mississauga (CA); C. Geoffrey Allen, Waterdown (CA); Maria Mihaela Birau, Mississauga (CA); Richard P. N. Veregin, Mississauga (CA); Jordan H. Wosnick, Toronto (CA); Valerie M. Farrugia, Oakville (CA)

(73) Assignee: Xerox Corporation, Norwalk, CT (US)

( * ) Notice: Subject to any disclaimer, the term of this patent is extended or adjusted under 35 U.S.C. 154(b) by 658 days.

(21) Appl. No.: 12/689,306

(22) Filed: Jan. 19, 2010

(65) Prior Publication Data

US 2011/0177247 A1    Jul. 21, 2011

(51) Int. Cl.
*C09D 11/02* (2006.01)
*B05D 5/00* (2006.01)

(52) U.S. Cl.
USPC ........................ 427/256; 106/31.13; 106/31.6

(58) Field of Classification Search
None
See application file for complete search history.

(56) References Cited

U.S. PATENT DOCUMENTS

| | | | |
|---|---|---|---|
| 4,251,824 A | 2/1981 | Hara et al. | |
| 4,410,899 A | 10/1983 | Haruta et al. | |
| 4,412,224 A | 10/1983 | Sugitani | |
| 4,532,530 A | 7/1985 | Hawkins | |
| 4,601,777 A | 7/1986 | Hawkins et al. | |
| 4,830,671 A | 5/1989 | Frihart et al. | |
| 4,889,560 A | 12/1989 | Jaeger et al. | |
| 4,889,761 A | 12/1989 | Titterington et al. | |
| 5,122,187 A | 6/1992 | Schwarz et al. | |
| 5,194,638 A | 3/1993 | Frihart et al. | |
| 5,372,852 A | 12/1994 | Titterington et al. | |
| 5,389,958 A | 2/1995 | Bui et al. | |
| 5,597,856 A | 1/1997 | Yu et al. | |
| 5,782,996 A | 7/1998 | Fan | |
| 6,174,937 B1 | 1/2001 | Banning et al. | |
| 6,309,453 B1 | 10/2001 | Banning et al. | |
| 6,380,423 B2 | 4/2002 | Banning et al. | |
| 6,406,528 B1 | 6/2002 | Macholdt et al. | |
| 6,464,766 B1 | 10/2002 | Banning et al. | |
| 6,620,228 B1 | 9/2003 | King et al. | |
| 6,858,070 B1 | 2/2005 | Wong et al. | |
| 6,860,930 B2 | 3/2005 | Wu et al. | |
| 6,906,118 B2 | 6/2005 | Goodbrand et al. | |
| 7,186,762 B2 | 3/2007 | Wong et al. | |
| 7,677,713 B2 | 3/2010 | Turek et al. | |
| 2003/0105185 A1 | 6/2003 | Goodbrand et al. | |
| 2004/0255809 A1 | 12/2004 | Horie | |
| 2007/0120921 A1 | 5/2007 | Carlini et al. | |
| 2007/0120924 A1 | 5/2007 | Odell et al. | |
| 2008/0098929 A1 | 5/2008 | Turek et al. | |
| 2008/0122914 A1 | 5/2008 | Toma et al. | |
| 2008/0297556 A1 | 12/2008 | Turek et al. | |
| 2009/0087769 A1* | 4/2009 | Weber et al. | ............ 430/108.23 |
| 2009/0188403 A1* | 7/2009 | Sugimoto | ..................... 101/365 |

FOREIGN PATENT DOCUMENTS

| | | | | |
|---|---|---|---|---|
| DE | 601 30 097 T2 | 12/2007 | | |
| EP | 0 867 487 A3 | 9/1998 | | |
| EP | 1 475 419 | 11/2004 | | |
| GB | 2 238 792 A | 12/1991 | | |
| JP | 10-279855 A | 10/1998 | | |
| JP | 2004-18630 A | 1/2004 | | |
| WO | PCT/EP2006/003625 | * 10/2007 | ............. C09B 67/04 | |

OTHER PUBLICATIONS

Office Action issued in German Patent Application No. 10 2011 002 594.4 mailed Nov. 23, 2011.
Search Report dated May 19, 2011 issued in British Patent Application No. 1100904.0.
Office Action issued in Canadian Patent Application No. 2,727,505 mailed Jun. 15, 2012.
Canadian Office Action dated Jan. 25, 2013 issued in Canadian Patent Application No. 2,727,505.
Canadian Office Action dated Mar. 8, 2013 issued in Canadian Patent Application No. 2,727,503.
Office Action issued May 10, 2013 in U.S. Appl. No. 12/689,286.
Office Action dated Aug. 30, 2013 issued in Canadian Patent Application No. 2,727,505.
Office Action dated Oct. 3, 2013 issued in Canadian Patent Application No. 2,727,504.
Office Action dated Nov. 8, 2013 issued in Canadian Patent Application No. 2,727,503.

* cited by examiner

*Primary Examiner* — Yun Qian
(74) *Attorney, Agent, or Firm* — Oliff PLC

(57) ABSTRACT

A light-cyan solid ink including an ink vehicle and a colorant. The colorant includes a cyan colorant, a hue-adjusting colorant that absorbs light having a wavelength of from about 500 to about 600 nm, and an optional shade-adjusting colorant that absorbs light having a wavelength of from about 400 to about 500 nm.

13 Claims, 2 Drawing Sheets

INK COMPOSITIONS

TECHNICAL FIELD

This disclosure is generally directed to solid ink compositions. More specifically, this disclosure is directed to light-cyan solid inks, methods of making light-cyan solid inks, and methods of forming images with light-cyan solid inks.

BACKGROUND

Inkjet printing systems and solid inks are known in the art. However, while known solid ink compositions are used successfully, a need remains for improved solid ink compositions capable of being used to develop higher quality images.

Solid ink colors typically include, for example, cyan, magenta, yellow, and black. In addition to these conventional colors, solid ink compositions of lighter colors may also be desirable. Light-colored inks, in combination with the typical inks, may enable very high quality images while suppressing image quality defects such as graininess and mottle over the tone range from the low density area to the high density area.

However, obtaining effective light-colored inks is not as trivial as simply preparing an ink composition with a reduced colorant load of the conventional colorant. This is because there are significant hue differences between, for example, a low-colorant-loaded cyan ink and the full-colorant-loaded cyan ink.

As a result, there exists a need to develop light-colored solid inks to achieve higher quality images.

SUMMARY

The present disclosure in embodiments addresses these various needs and problems by providing a light-cyan solid ink comprising: an ink vehicle and a colorant, the colorant comprising a cyan colorant, a hue-adjusting colorant that absorbs light having a wavelength of from about 500 to about 600 nm, and an optional shade-adjusting colorant that absorbs light having a wavelength of from about 400 to about 500 nm.

Embodiments also include methods for making such inks and methods of forming images with such inks.

These and other improvements are accomplished by the compositions and methods described in embodiments herein.

EMBODIMENTS

Figure 1:
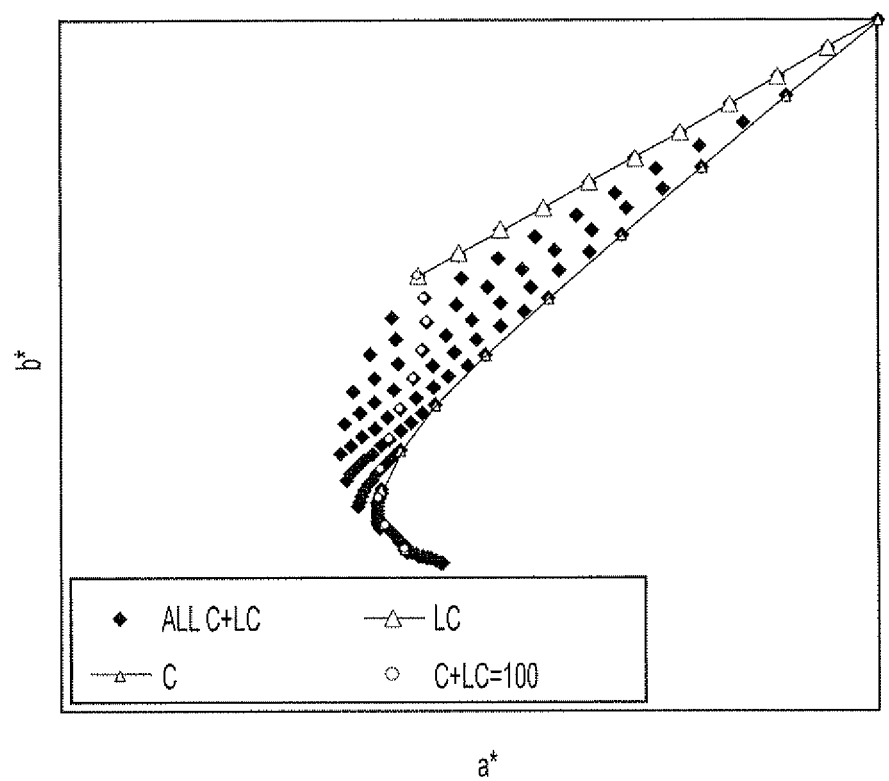
FIG. 1 is a graph of b* vs. a* illustrating the color difference between a light-cyan solid ink that is not hue corrected relative to the target halftone trajectory of the nominal cyan solid ink.

This disclosure is not limited to the particular embodiments described herein, and some components and processes may be varied by one of ordinary skill, based on this disclosure.

Exemplary ink compositions provide superior print quality while meeting requirements of typical printing processes. The present disclosure provides a light-cyan solid ink comprising: an ink vehicle, and a colorant, the colorant comprising a cyan colorant, a hue-adjusting colorant that absorbs light having a wavelength of from about 500 to about 600 nm, and an optional shade-adjusting colorant that absorbs light having a wavelength of from about 400 to about 500 nm.

Solid ink image forming systems typically have cyan, magenta, yellow and black inks in a four print-head system. In digital imaging, these colored inks are generally used by printing halftone dots in varying concentrations and combinations to form the desired image. While the halftone dots themselves are typically small enough that they are not visible, the texture produced by these dots is visible, and may be unacceptable for certain high quality applications, such as printing high quality photographs. In addition to objectionable halftone texture, even small levels of nonuniformity can lead to objectionable visible noise, such as graininess, mottle, etc. The objectionable visible texture and noise can be significantly reduced by the use of light-colored inks.

Image quality may be improved by adding one, two, or more additional inks to form a system with five, six, or more print heads. One color of ink that will provide immense value and increase image quality is light cyan. Light-cyan inks can enable very high quality images and suppress image quality defects such as graininess and mottle over the tone range from a low density area to a high density area.

However, obtaining effective light-colored inks is not as trivial as simply preparing an ink composition with a reduced colorant load of the conventional colorant used in the fully loaded ink. There is a significant hue difference between a low-colorant-loaded cyan ink and the full-colorant-loaded cyan ink. This is caused by unwanted absorptions leading to color variation across the tone reproduction curve (TRC). In embodiments, the undesirable absorptions are corrected by providing a cyan ink that is shaded with additional colorants to correct for the hue shift and thereby smooth the TRC while still providing the desired light-cyan color.

In this specification and the claims that follow, singular forms such as "a," "an," and "the" include plural forms unless the content clearly dictates otherwise. All ranges disclosed herein include, unless specifically indicated, all endpoints and intermediate values. In addition, reference may be made to a number of terms that shall be defined as follows:

The term "functional group" refers, for example, to a group of atoms arranged in a way that determines the chemical properties of the group and the molecule to which it is attached. Examples of functional groups include halogen atoms, hydroxyl groups, carboxylic acid groups, and the like.

As used herein, the term "viscosity" refers to a complex viscosity, which is the typical measurement provided by a mechanical rheometer capable of subjecting a sample to a steady shear strain or a small amplitude sinusoidal deformation. In this type of instrument, the shear strain is applied by the operator to the motor and the sample deformation (torque) is measured by the transducer. Alternatively, a controlled-stress instrument, where the shear stress is applied and the resultant strain is measured, may be used. Such a rheometer provides a periodic measurement of viscosity at various plate rotation frequencies, $\omega$, rather than the transient measurement of, for instance, a capillary viscometer. The reciprocating plate rheometer is able to measure both the in phase and out of phase fluid response to stress or displacement. The complex viscosity, $\eta^*$, is defined as $\eta^* = \eta' - i\eta''$; where $\eta' = G''/\omega$, $\eta'' = G'/\omega$ and $i$ is $\sqrt{-1}$. Alternatively a viscometer that can measure only the transient measurement of, for instance, a capillary or shear viscosity can also be used.

"Optional" or "optionally" refer, for example, to instances in which subsequently described circumstance may or may not occur, and include instances in which the circumstance occurs and instances in which the circumstance does not occur.

The terms "one or more" and "at least one" refer, for example, to instances in which one of the subsequently described circumstances occurs, and to instances in which more than one of the subsequently described circumstances occurs.

Ink Vehicles

In embodiments, the solid ink includes at least one ink vehicle (also known as a carrier material) or a mixture of two or more ink vehicles.

The ink vehicle or mixture is solid at temperatures of about 20° C. to about 27° C., for example room temperature, and specifically is solid at temperatures below about 40° C. However, the ink vehicle changes phase upon heating, and is in a molten state at jetting temperatures.

In embodiments, the ink vehicle may have a melting point of from about 60° C. to about 150° C., for example from about 80° C. to about 120° C., from about 85° C. to about 110° C., from about 100° C. to about 110° C., or from about 105° C. to about 110° C. as determined by, for example, observation and measurement on a microscope hot stage, wherein the binder material is heated on a glass slide and observed by microscope. Higher melting points are also acceptable, although printhead life may be reduced at temperatures higher than 150° C.

Any suitable ink vehicle can be employed. Suitable vehicles may include ethylene/propylene copolymers, highly branched hydrocarbons, hydrocarbon-based waxes, paraffins, high molecular weight linear alcohols, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers such as further discussed below, and mixtures thereof.

Examples of suitable specific ink vehicles include, for example, polyethylene, such as those available from Baker Petrolite having the following general formula:

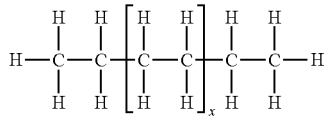

wherein x is an integer of from about 1 to about 200, such as from about 5 to about 150 or from about 12 to about 105. These materials may have a melting point of from about 60° C. to about 150° C., such as from about 70° C. to about 140° C., or from about 80° C. to about 130° C.; and a molecular weight (Mn) of from about 100 to about 5,000, such as from about 200 to about 4,000, or from about 400 to about 3,000. Examples of wax ink vehicles include POLYWAX 400 (Mn about 400), distilled POLYWAX 400 having a viscosity of about 10% to about 100% higher than the viscosity of the undistilled POLYWAX 400 at about 110° C., POLYWAX 500 (Mn about 500), distilled POLYWAX 500 having a viscosity of about 10% to about 100% higher than the viscosity of the undistilled POLYWAX 500 at about 110° C., POLYWAX 655 (Mn about 655), distilled POLYWAX 655 having a viscosity of about 10% to about 50% lower than the viscosity of the undistilled POLYWAX 655 at about 110° C., and distilled POLYWAX 655 having a viscosity of about 10% to about 50% higher than the viscosity of the undistilled POLYWAX 655 at about 110° C., POLYWAX 850 (Mn about 850), POLYWAX 1000 (Mn about 1,000), and the like.

Further examples include ethylene/propylene copolymers, such as those available from Baker Petrolite having the following general formula:

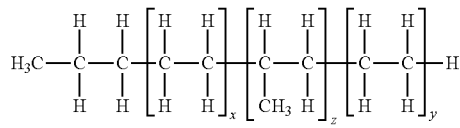

wherein z represents an integer from 0 to about 30, such as from 0 to about 20 or from 0 to about 10, y represents an integer from 0 to about 30, such as from 0 to about 20 or from 0 to about 10; and x is equal to about 21-y. The distribution of the side branches may be random along the carbon chain. The copolymers may have, for example, a melting point of from about 70° C. to about 150° C., such as from about 80° C. to about 130° C. or from about 90° C. to about 120° C.; and a molecular weight range of from about 500 to about 4,000. Commercial examples of such copolymers include, for example, Petrolite CP-7 (Mn=650), Petrolite CP-11 (Mn=1,100), Petrolite CP-12 (Mn=1,200), and the like.

Additional examples include highly branched hydrocarbons, typically prepared by olefin polymerization, such as the VYBAR materials available from Baker Petrolite, including VYBAR 253 (Mn=520), VYBAR 5013 (Mn=420), and the like. Another type of ink vehicle may be n-paraffinic, branched paraffinic, and/or aromatic hydrocarbons, typically with from about 5 to about 100, such as from about 20 to about 180 or from about 30 to about 60, generally prepared by the refinement of naturally occurring hydrocarbons, such as BE SQUARE 185 and BE SQUARE 195, with molecular weights (Mn) of from about 100 to about 5,000, such as from about 250 to about 1,000 or from about 500 to about 800, for example such as available from Baker Petrolite.

Another example includes modified maleic anhydride hydrocarbon adducts of polyolefins prepared by graft copolymerization, such as those available from Baker Petrolite and of the following general formulas:

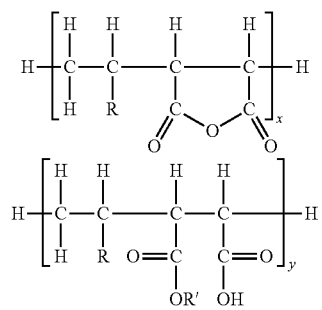

wherein R is an alkyl group with from about 1 to about 50, such as from about 5 to about 35 or from about 6 to about 28 carbon atoms; R' is an ethyl group, a propyl group, an isopropyl group, a butyl group, an isobutyl group, or an alkyl group with from about 5 to about 500, such as from about 10 to about 300 or from about 20 to about 200 carbon atoms; x is an integer of from about 9 to about 13; and y is an integer of from about 1 to about 50, such as from about 5 to about 25 or from about 9 to about 13. The above materials have melting points of from about 50° C. to about 150° C., such as from about 60° C. to about 120° C. or from about 70° C. to about 100° C.

The above materials also include those materials available from Baker Petrolite and of the general formula

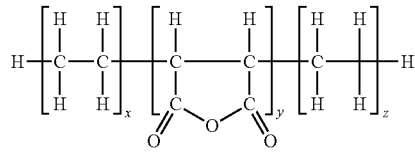

wherein x is an integer of from about 1 to about 50, such as from about 5 to about 25 or from about 9 to about 13; y is 1 or 2; and z is an integer of from about 1 to about 50, such as from about 5 to about 25 or from about 9 to about 13.

The above materials also include those materials available from Baker Petrolite and of the general formula

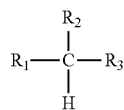

wherein $R_1$ and $R_3$ are hydrocarbon groups and $R_2$ is either of one of the general formulas

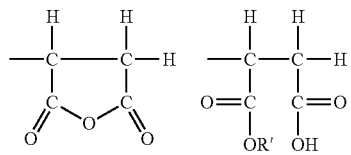

or a mixture thereof, wherein R' is an isopropyl group. The materials may have melting points of from about 70° C. to about 150° C., such as from about 80° C. to about 130° C. or from about 90° C. to about 125° C., with examples of modified maleic anhydride copolymers including CERAMER 67 (Mn=655, Mw/Mn=1.1), CERAMER 1608 (Mn=700, Mw/Mn=1.7), and the like.

Further examples include high molecular weight linear alcohols, such as those available from Baker Petrolite and of the general formula

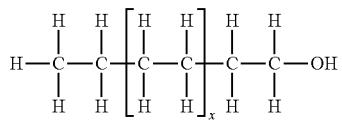

wherein x is an integer of from about 1 to about 50, such as from about 5 to about 35 or from about 11 to about 23. These materials may have a melting point of from about 50° C. to about 150° C., such as from about 70° C. to about 120° C. or from about 75° C. to about 110° C.; and a molecular weight range of from about 100 to about 5,000, such as from about 200 to about 2,500 or from about 300 to about 1,500. Commercial examples include the UNILIN materials such as UNILIN 425 (Mn=460), UNILIN 550 (Mn=550), UNILIN 700 (Mn=700), and the like.

In addition, the ink vehicle may be an ethoxylated alcohol, such as available from Baker Petrolite and of the general formula

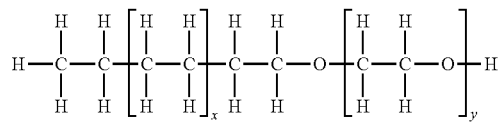

wherein x is an integer of from about 1 to about 50, such as from about 5 to about 40 or from about 11 to about 24; and y is an integer of from about 1 to about 70, such as from about 1 to about 50 or from about 1 to about 40. The materials may have a melting point of from about 60° C. to about 150° C., such as from about 70° C. to about 120° C. or from about 80° C. to about 110° C. and a molecular weight range of from about 100 to about 5,000, such as from about 500 to about 3,000 or from about 500 to about 2,500. Commercial examples include UNITHOX 420 (Mn=560), UNITHOX 450 (Mn=900), UNITHOX 480 (Mn=2,250), UNITHOX 520 (Mn=700), UNITHOX 550 (Mn=1,100), UNITHOX 720 (Mn=875), UNITHOX 750 (Mn=1,400), and the like.

In addition, the ink vehicles described in U.S. Pat. No. 6,906,118, incorporated herein by reference in its entirety, may also be used. Also suitable as ink vehicles are liquid crystalline materials as disclosed in, for example, U.S. Pat. No. 5,122,187, the disclosure of which is incorporated herein by reference in its entirety.

Urethane, urea, amide and imide derivatives of oxidized synthetic or petroleum waxes, such as those available from Baker Petrolite having the following general formulas may also be used as the ink vehicle:

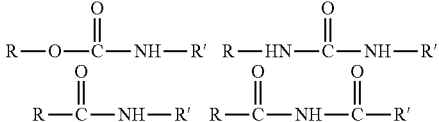

wherein R is an alkyl group of the formula $CH_3(CH_2)_n$; n is an integer of from about 5 to about 400, such as from about 10 to about 300 or from about 20 to about 200; and R' is a tolyl group. In embodiments, the urethane, urea, amide and imide derivatives may be linear, branched, cyclic, and any combination thereof These materials may have a melting point of from about 60° C. to about 120° C., such as from about 70° C. to about 100° C. or from about 70° C. to about 90° C. Commercial examples of such materials include, for example, bis-urethanes such as PETROLITE CA-11, PETROLITE WB-5, and PETROLITE WB-17, all available from Baker Petrolite, and the like. Suitable examples also include urethane, urea, amide and imide derivatives disclosed in U.S. Pat. Nos. 6,620,228, 6,380,423, 6,464,766 and 6,309,453, each of which is incorporated herein by reference.

Additional resins and waxes may further be selected from the group consisting of a urethane resin obtained from the reaction of two equivalents of ABITOL E hydroabietyl alcohol and one equivalent of isophorone diisocyanate, prepared as described in U.S. Pat. No. 5,782,996, the disclosure of which is totally incorporated herein by reference; a urethane resin that was the adduct of three equivalents of stearyl isocyanate and a glycerol base alcohol, prepared as described in Example 4 of U.S. Pat. No. 6,309,453 the disclosure of which is totally incorporated herein by reference; and suitable amides including, for example, diamides, triamides, tetraamides, cyclic amides, and the like. Fatty amides including monoamides, tetra-amides, and mixtures thereof, may also be included in the ink vehicle such as, for example, those described in U.S. Pat. Nos. 4,889,560, 4,889,761, 5,194,638, 4,830,671, 6,174,937, 5,372,852, 5,597,856, and 6,860,930 and British Patent No. GB 2 238 792, the entire disclosures of each are incorporated herein by reference; and those similar to what is described in U.S. Pat. No. 6,620,228, which is incorporated herein by reference in its entirety.

Fatty amides, such as monoamides, tetra-amides, mixtures thereof, and the like, such as those described in U.S. Pat. No. 6,858,070, incorporated herein by reference, may also be used. Suitable monoamides may have a melting point of at least about 50° C., for example from about 50° C. to about 150° C., although the melting point can be below this temperature. Specific examples of suitable monoamides include primary monoamides and secondary monoamides. Exemplary primary monoamides include stearamide, such as KEMAMIDE S available from Chemtura Corp. and CRODAMIDE S available from Croda; behenamide/arachidamide, such as KEMAMIDE B available from Chemtura and CRODAMIDE BR available from Croda; oleamide, such as KEMAMIDE U available from Chemtura and CRODAMIDE OR available from Croda, technical grade oleamide, such as KEMAMIDE O available from Chemtura, CRODAMIDE O available from Croda, and UNISLIP 1753 available from Uniqema; and erucamide such as KEMAMIDE E available from Chemtura and CRODAMIDE ER available from Croda. Exemplary secondary amides include behenyl behenamide, such as KEMAMIDE EX666 available from Chemtura; stearyl stearamide, such as KEMAMIDE S-180 and KEMAMIDE EX-672 available from Chemtura; stearyl erucamide, such as KEMAMIDE E-180 available from Chemtura and CRODAMIDE 212 available from Croda; erucyl erucamide, such as KEMAMIDE E-221 available from Chemtura; oleyl palmitamide, such as KEMAMIDE P-181 available from Chemtura and CRODAMIDE 203 available from Croda; and erucyl stearamide, such as KEMAMIDE S-221 available from Chemtura. Additional suitable amide materials include KEMAMIDE W40 (N,N'-ethylenebisstearamide), KEMAMIDE P181 (oleyl palmitamide), KEMAMIDE W45 (N,N'-thylenebisstearamide), and KEMAMIDE W20 (N,N-ethylenebisoleamide).

Further resins suitable for use herein include triamides, such as those disclosed in U.S. Pat. No. 6,860,930 and U.S. Patent Application Publication No. 2008/0098929 (the entire disclosures of which are incorporated herein by reference). Triamides suitable for use include linear triamides, which are molecules where all three amide groups are drawn in the same molecular chain or branch. Examples of linear triamides include those triamides having the following formulas:

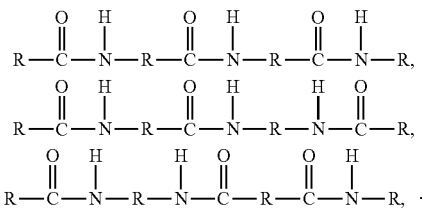

R can be any hydrocarbon having from about 1 to about 200 carbon atoms, such as from about 25 to 150 or from about 30 to about 100.

Linear triamides can further include those wherein a line can be drawn through the three amide groups, even if one would ordinarily draw a different line. One example of such a triamide can be expressed by the following formula:

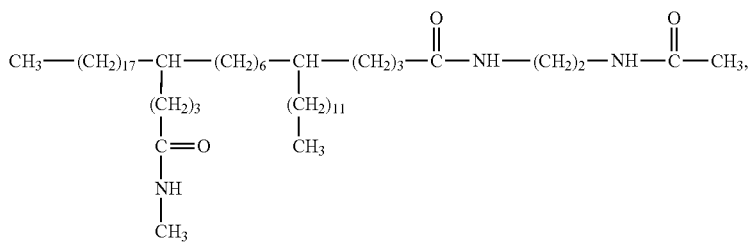

which can also be drawn as:

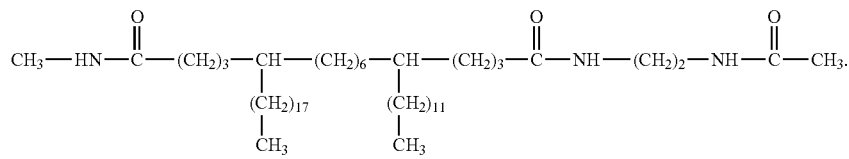

In embodiments, the triamide may also be a branched triamide. Examples of suitable branched triamides include those triamides disclosed in U.S. Pat. No. 6,860,930 and U.S. Patent Application Pub. No. 2008/0297556, each of which are incorporated herein in their entirety by reference. Any branched triamide disclosed in U.S. Pat. No. 6,860,930 and U.S. Patent Application Pub. No. 2008/0297556, is suitable for use herein.

Additional examples of suitable ink vehicles for the solid inks include rosin esters, such as glyceryl abietate (KE-100®); polyamides; dimer acid amides; fatty acid amides, including ARAMID C; epoxy resins, such as EPOTUF 37001, available from Riechold Chemical Company; fluid paraffin waxes; fluid microcrystalline waxes; Fischer-Tropsch waxes; polyvinyl alcohol resins; polyols; cellulose esters; cellulose ethers; polyvinyl pyridine resins; fatty acids; fatty acid esters; poly sulfonamides, including KETJENFLEX MH and KETJENFLEX MS80; benzoate esters, such as BENZOFLEX S552, available from Velsicol Chemical Company; phthalate plasticizers; citrate plasticizers; maleate plasticizers; polyvinyl pyrrolidinone copolymers; polyvinyl pyrrolidone/polyvinyl acetate copolymers; novolac resins, such as DUREZ 12 686, available from Occidental Chemical Company; and natural product waxes, such as beeswax, montan wax, candelilla wax, GILSONITE (American Gilsonite Company), and the like; mixtures of linear primary alcohols with linear long-chain amides or fatty acid amides, such as those with from about 6 to about 24 carbon atoms, including PARICIN 9 (propylene glycol monohydroxystearate), PARICIN 13 (glycerol monohydroxystearate), PARKIN 15 (ethylene glycol monohydroxystearate), PARICIN 220 (N(2-hydroxyethyl)-12-hydroxystearamide), PARICIN 285 (N,N'-ethylene-bis-12-hydroxystearamide), FLEXRICIN 185 (N,N'-ethylene-bis-ricinoleamide); and the like. Further, linear long-chain sulfones with from about 4 to about 16 carbon atoms, such as diphenyl sulfone, n-amyl sulfone, n-propyl sulfone, n-pentyl sulfone, n-hexyl sulfone, n-heptyl sulfone, n-octyl sulfone, n-nonyl sulfone, n-decyl sulfone, n-undecyl sulfone, n-dodecyl sulfone, n-tridecyl sulfone, n-tetradecyl sulfone, n-pentadecyl sulfone, n-hexadecyl sulfone, chlorophenyl methyl sulfone, and the like, are suitable ink vehicle materials.

The ink vehicle may comprise from about 25% to about 99.5% by weight of the ink, such as from about 30% to about 98%, from about 50% to about 85%, or from about 70% to about 80%.

Colorants

In embodiments, the light-cyan solid ink includes at least one colorant or a mixture of two or more colorants. As used herein the term "colorant" includes pigments, dyes, mixtures of dyes, mixtures of pigments, mixtures of dyes and pigments, and the like.

In embodiments, "light-cyan" inks may be produced that are lighter (i.e., they have a higher lightness or CIE (Commission International de l'Eclairage) L* value) than a conventional cyan ink. If the light ink is made simply by reducing the colorant concentration below that used in the corresponding conventional fully loaded ink, then the color of the light ink is generally shifted significantly relative to that of the conventional ink when halftoned to the same lightness. This can lead to objectionable color discontinuities when transitioning from the light ink to the conventional ink. In embodiments, by proper selection of combinations of colorants utilized in the composition of these light inks, it is possible to compensate for the above-mentioned undesirable color shift, such that the transition from the light ink to the conventional ink occurs smoothly and is not objectionable.

Measurement of the color can, for example, be characterized by CIE specifications, commonly referred to as CIE L*, a*, b*, where L*, a*, and b* are the modified opponent color coordinates, which form a 3 dimensional space, with L* characterizing the lightness of a color, a* approximately characterizing the redness, and b* approximately characterizing the yellowness of a color. The pigment concentration should be chosen so that lightness (L*) corresponds with the desired ink mass on the substrate. All of these parameters may be measured with any industry standard spectrophotometer including those obtained, for example, from X-Rite Corporation. Color differences may be quantified as Delta E, or the color difference between a sample color and a reference color. Delta E may be calculated by any acceptable formula known in the art, for example, by using the CIE DE2000 formula. The L*, a*, b* data required for determining DE2000 may be calculated, for example, under D50 illuminant and 2° observer, using Reflectance spectra which may be measured with a spectrophotometer, for example, a GretagMacbeth Spectrolino spectrophotometer.

In light-cyan solid ink compositions, the target color for the light inks may be selected to substantially match or substantially be the same as the color of a nominal cyan solid ink when printed at any one halftone area coverage value of from about 15% to about 70% halftone area coverage, such as from about 30% to about 50%, or about 40% halftone area coverage, depending on the image quality requirements and system performance. Thus, the light-cyan solid inks (at 100% solid) have a lightness L* of about 10 to about 45 units above that of the nominal cyan solid ink (at 100% solid), such as about 20 to about 35 units above that of the nominal cyan solid ink (at 100% solid). The color of the light-cyan solid inks substantially match that of the corresponding halftoned nominal cyan solid ink. Colors are "substantially" the same when the colors have a DE2000 color difference of less than about 5, such as less than about 3, or less than about 1. Thus, a light-cyan ink may include, for example, inks having a lighter color compared to the conventional cyan color, which, in embodiments, may have a lightness from about 120% to about 200% that of the conventional cyan ink, in other embodiments from about 140% to about 170% that of the conventional cyan ink. Thus, in embodiments the light-cyan inks achieve the above L* values and match the color of a particular halftoned tint of the conventional cyan ink.

In embodiments, light-cyan inks may be produced by combining a cyan colorant with a hue-adjusting colorant and an optional shade-adjusting colorant. Each of the cyan, hue-adjusting, and shade-adjusting colorants may be a single colorant or a combination of colorants, although the cyan, hue-adjusting, and shade-adjusting colorants are different from each other.

In embodiments, the light-cyan inks disclosed herein may contain any suitable cyan colorant. Cyan colorants include a colorant or combination of colorants that absorb wavelengths of light from about 600 to about 700 nm. More specifically, cyan colorants with a significant absorption of light in the wavelength range from about 600 to about 700 nm may be used. "Significant absorption" in embodiments encompasses absorption which is at least about 80% of the peak absorption in the visible range. Cyan colorants may include colorants such as Pigment Blue 15:3, Pigment Blue 15:4, Pigment Blue 16, Solvent Blue 35, Solvent Blue 38, Solvent Blue 48, Solvent Blue 70, Solvent Blue 101, and combinations thereof. The cyan colorant may be present in an amount of from about 0.05% to about 6% by weight of the ink, or from about 0.2% to about 1.5% by weight of the ink.

In embodiments, hue-adjusting colorants for a light-cyan ink may include a colorant or combination of colorants that absorb wavelengths of light from about 500 to about 600 nm. More specifically, hue-adjusting colorants with a significant absorption of light in the wavelength range from about 500 to about 600 nm may be used. Examples include blue and magenta colorants such as Pigment Blue 61, Pigment Red 57:1, Pigment Red 81:2, Pigment Red 122, Pigment Red 184, Pigment Red 185, Pigment Red 238, Pigment Red 269, Solvent Red 49, Solvent Red 52, Solvent Red 151, Solvent Red 155, Solvent Red 172, Solvent Violet 13, Solvent Blue 97, Solvent Blue 102, Solvent Blue 104, Solvent Blue 128, and combinations thereof. The hue-adjusting colorant may be present in an amount of from about 0.001% to about 1% by weight of the ink, or from about 0.04% to about 0.2% by weight of the ink.

In embodiments, shade-adjusting colorants for a light-cyan ink may include a colorant or combination of colorants that absorb wavelengths of light from about 400 to about 500 nm.

More specifically, shade-adjusting colorants with a significant absorption of light in the wavelength range from about 400 to about 500 nm may be used. Examples include yellow, orange, red, and black colorants such as Pigment Yellow 12, Pigment Yellow 17, Pigment Yellow 74, Pigment Yellow 83, Pigment Yellow 97, Pigment Yellow 139, Pigment Yellow 155, Pigment Yellow 180, Pigment Orange 2, Pigment Orange 5, Pigment Orange 38, Pigment Orange 64, Pigment Red 4, Pigment Red 38, Pigment Red 66, Pigment Red 119, Pigment Red 178, Carbon Black, Solvent Yellow 16, Solvent Yellow 93, Solvent Yellow 104, Solvent Yellow 163, Solvent Yellow 141, Solvent Red 111, Solvent Black 7, Solvent Black 27, Solvent Black 45, and combinations thereof. The shade-adjusting colorant may be present in an amount of from about 0.001% to about 0.6% by weight of the ink, or from about 0.003% to about 0.05% by weight of the ink.

In embodiments, the total colorant may comprise from about 0.1% to about 10% by weight of the ink, such as from about 0.2% to about 5% by weight of the ink.

Colorants suitable for use herein include pigment particles having an average particle size of from about 15 nm to about 500 nm, such as from about 50 nm to about 200 nm in volume average diameter.

Additional Additives

The ink of embodiments may further include conventional additives to take advantage of the known functionality associated with such conventional additives. Such additives may include, for example, dispersants, propellants, biocides, defoamers, slip and leveling agents, plasticizers, viscosity modifiers, antioxidants, UV absorbers, tackifiers, adhesives, conductivity enhancing agents, etc.

Dispersants.

To enable dispersion of the pigment colorants in the liquid vehicle, a dispersant or combination of dispersants may optionally be provided. Typically, dispersants may be used to stabilize particles in the non-polar ink vehicle. The dispersant generally comprises first functional groups that anchor the dispersant to the pigment particles and second functional groups that are compatible with the ink vehicle. The first functional groups can suitably anchor or adsorb to the pigment particle in any suitable manner, such as hydrogen bonding, chemical bonding, acid-base reaction, Van der Waals interactions, and the like.

Thus, examples of suitable first functional groups that anchor the dispersant to the pigment particles include such functional groups as esters, amides, carboxylic acids, hydroxyl groups, anhydrides, urethanes, ureas, amines, amides, salt groups such as quaternary ammonium salts, and the like. The first functional groups anchor the dispersant to the colorant particles such that the dispersant is, for example, adsorbed, attached to, or grafted to the pigment particle. Likewise, examples of the second functional groups that are compatible with the ink vehicle include groups such as alkyl groups, which can be straight or branched, saturated or unsaturated, and the like. These second functional groups are compatible with, in particular, low polarity ink vehicle components.

Examples of suitable dispersants that may be used in embodiments include, but are not limited to, BYK-UV 3500, BYK-UV 3510 (BYK-Chemie); Dow Corning 18, 27, 57, 67 Additives; ZONYL FSO 100 (DuPont); MODAFLOW 2100 (Solutia); FOAM BLAST 20F, 30, 550 (Lubrizol); EFKA-1101, -4046, -4047, -2025, -2035, -2040, -2021, -3600, -3232; SOLSPERSE 13240, 16000, 17000, 17940, 19000, 28000, 32500, 38500, 39000, 54000 (Lubrizol); and mixtures thereof. Individual dispersants or combinations may optionally be used with synergists including SOLSPERSE 5000, 12000, 22000 (Lubrizol); DISPERBYK-108, -163, -167, 182 (BYK-Chemie); and K-SPERSE 132, XD-A503, XD-A505 (King Industries).

The dispersant may be present in the solid ink in any effective amount, such as in amounts of from about 0.5% to about 40% by weight of the ink, such as from about 5% to about 25%, or from about 8% to about 13%.

Plasticizers.

The ink may include an optional plasticizer, such as UNIPLEX 250 (commercially 20 available from Uniplex); the phthalate ester plasticizers commercially available from Monsanto under the trade name SANTICIZER, such as dioctyl phthalate, diundecyl phthalate, alkylbenzyl phthalate (SANTICIZER 278); triphenyl phosphate (commercially available from Mon25 Santo); KP-140, a tributoxyethyl phosphate (commercially available from FMC Corporation); MORFLEX® 150, a dicyclohexyl phthalate (commercially available from Morflex Chemical Company Inc.); trioctyl trimellitate (commercially available from Eastman. Kodak Co.); pentaerythritol tetrabenzoate, commercially available as BENZOFLEX S552 (Velsicol Chemical Corporation); trimethyl titrate, commercially available as CITROFLEX 1 (Monflex Chemical Company); N,N-dimethyl oleamide, commercially available as HALCOMID M-18-OL (C. P. Hall Company); a benyl phthalate, commercially available as SANTICTZER 278 (Ferro Corporation); and the like.

Plasticizers may either function as the ink vehicle or may act as an agent to provide compatibility between the ink propellant, which generally is polar, and the ink vehicle, which generally is non-polar. In embodiments, if the plasticizer functions as the ink vehicle, it may constitute from about 1% to 100% of the ink vehicle component of the ink. Alternatively, if the plasticizer functions as an additive in addition to another ink vehicle, the plasticizer may be present in an amount of at least about 0.05% by weight of the ink, such as at least about 1%, or at least about 2%, but typically no more than about 15%.

Viscosity Modifiers.

The ink may further include an optional viscosity modifier. Examples of suitable viscosity modifiers include aliphatic ketones; stearone; 2-hydroxybenzyl alcohol; 4-hydroxybenzyl alcohol; 4-nitrobenzyl alcohol; 4-hydroxy-3-methoxy benzyl alcohol; 3-methoxy-4-nitrobenzyl alcohol; 2-amino-5-chlorobenzyl alcohol; 2-amino-5-methylbenzyl alcohol; 3-amino-2-methylbenzyl alcohol; 3-amino-4-methyl benzyl alcohol; 2(2-(aminomethyl)phenylthio)benzyl alcohol; 2,4,6-trimethylbenzyl alcohol; 2-amino-2-methyl-1,3-propanediol; 2-amino-1-phenyl-1,3-propanediol; 2,2-dimethyl-1-phenyl-1,3-propanediol; 2-bromo-2-nitro-1,3-propanediol; 3-tert-butylamino-1,2-propanediol; 1,1-diphenyl-1,2-propanediol; 1,4-dibromo-2,3-butanediol; 2,3-dibromo-1,4-butanediol; 2,3-dibromo-2-butene-1,4-diol; 1,1,2-triphenyl-1,2-ethanediol; 2-naphthalenemethanol; 2-methoxy-1-naphthalenemethanol; decafluoro benzhydrol; 2-methylbenzhydrol; 1-benzeneethanol; 4,4'-isopropylidene bis(2-(2,6-dibromo phenoxy)ethanol); 2,2'-(1,4-phenylenedioxy)diethanol; 2,2-bis(hydroxymethyl)-2,2',2"-nitrilotriethanol; di(trimethylolpropane); 2-amino-3-phenyl-1-propanol; tricyclohexylmethanol; tris(hydroxymethyl) aminomethane succinate; 4,4'-trimethylene bis(1-piperidine ethanol); N-methyl glucamine; xylitol; or mixtures thereof. When present, the viscosity modifier is present in the ink in any effective amount, such as at least 10% by weight of the ink, no more than about 30%, no more than about 15%, or from about 30% to about 55% or from about 35% to about 50%.

Antioxidants.

The ink may optionally contain antioxidants to protect the images from oxidation and also may protect the ink components from oxidation while existing as a heated melt in the ink reservoir. Examples of suitable antioxidants include (1) N,N'-hexamethylene bis(3,5-di-tert-butyl-4-hydroxy hydrocinnamamide) (IRGANOX 1098, available from Ciba-Geigy Corporation), (2) 2,2-bis(4-(2-(3,5-di-tert-butyl-4-hydroxyhydrocinnamoyloxy))ethoxyphenyl)propane (TOPANOL-205, available from ICI America Corporation), (3) tris(4-tert-butyl-3-hydroxy-2,6-dimethyl benzyl) isocyanurate (CYANOX 1790, 41,322-4, LTDP, Aldrich D12,840-6), (4) 2,2'-ethylidene bis(4,6-di-tert-butylphenyl)fluoro phosphonite (ETHANOX-398, available from Ethyl Corporation), (5) tetrakis(2,4-di-tert-butylphenyl)-4,4'-biphenyl diphosphonite (ALDRICH 46,852-5; hardness value 90), (6) pentaerythritol tetrastearate (TCI America #PO739), (7) tributylammonium hypophosphite (Aldrich 42,009-3), (8) 2,6-di-tert-butyl-4-methoxyphenol (Aldrich 25,106-2), (9) 2,4-di-tert-butyl-6-(4-methoxybenzyl)phenol (Aldrich 23,008-1), (10) 4-bromo-2,6-dimethylphenol (Aldrich 34,951-8), (11) 4-bromo-3,5-didimethylphenol (Aldrich B6,420-2), (12) 4-bromo-2-nitrophenol (Aldrich 30,987-7), (13) 4-(diethyl aminomethyl)-2,5-dimethylphenol (Aldrich 14,668-4), (14) 3-dimethylaminophenol (Aldrich D14,400-2), (15) 2-amino-4-tert-amylphenol (Aldrich 41,258-9), (16) 2,6-bis(hydroxymethyl)-p-cresol (Aldrich 22,752-8), (17) 2,2'-methylenediphenol (Aldrich B4,680-8), (18) 5-(diethylamino)-2-nitrosophenol (Aldrich 26,951-4), (19) 2,6-dichloro-4-fluorophenol (Aldrich 28,435-1), (20) 2,6-dibromo fluoro phenol (Aldrich 26,003-7), (21) α-trifluoro-o-creso-1 (Aldrich 21,979-7), (22) 2-bromo-4-fluorophenol (Aldrich 30,246-5), (23) 4-fluorophenol (Aldrich F1,320-7), (24) 4-chlorophenyl-2-chloro-1,1,2-tri-fluoroethyl sulfone (Aldrich 13,823-1), (25) 3,4-difluoro phenylacetic acid (Aldrich 29,043-2), (26) 3-fluorophenylacetic acid (Aldrich 24,804-5), (27) 3,5-difluoro phenylacetic acid (Aldrich 29,044-0), (28) 2-fluorophenylacetic acid (Aldrich 20,894-9), (29) 2,5-bis(trifluoromethyl)benzoic acid (Aldrich 32,527-9), (30) ethyl-2-(4-(4-(trifluoromethyl)phenoxy)phenoxy)propionate (Aldrich 25,074-0), (31) tetrakis(2,4-di-tert-butyl phenyl)-4,4'-biphenyl diphosphonite (Aldrich 46,852-5), (32) 4-tert-amyl phenol (Aldrich 15,384-2), (33) 3-(2H-benzotriazol-2-yl)-4-hydroxy phenethylalcohol (Aldrich 43,071-4), NAUGARD 76, NAUGARD 445, NAUGARD 512, AND NAUGARD 524 (manufactured by Uniroyal Chemical Company), and the like, as well as mixtures thereof. The antioxidant, when present, may be present in the ink in any desired or effective amount, such as from about 0.25% to about 10% by weight of the ink or from about 1% to about 5%.

UV Absorbers.

The ink may also optionally contain a UV absorber. The optional UV absorbers primarily protect the generated images from UV degradation. Specific examples of suitable UV absorbers include (1) 2-bromo-2',4-dimethoxyacetophenone (Aldrich 19,948-6), (2) 2-bromo-2',5'-dimethoxyacetophenone (Aldrich 10,458-2), (3) 2-bromo-3'-nitroacetophenone (Aldrich 34,421-4), (4) 2-bromo-4'-nitroacetophenone (Aldrich 24,561-5), (5) 3',5'-diacetoxyacetophenone (Aldrich 11,738-2), (6) 2-phenylsulfonyl acetophenone (Aldrich 34,150-3), (7) 3'-aminoacetophenone (Aldrich 13,935-1), (8) 4'-aminoacetophenone (Aldrich A3,800-2), (9) 1H-benzotriazole-1-acetonitrile (Aldrich 46,752-9), (10) 2-(2H-benzotriazol-2-yl)-4,6-di-tert-pentylphenol (Aldrich 42,274-6), (11) 1,1-(1,2-ethane-diyl)bis(3,3,5,5-tetramethylpiperazinone) (commercially available from Goodrich Chemicals), (12) 2,2,4-trimethyl-1,2-hydroquinoline (commercially available from Mobay Chemical), (13) 2-(4-benzoyl-3-hydroxy phenoxy)ethylacrylate, (14) 2-dodecyl-N-(1,2,2,6,6-pentamethyl-4-piperidinyl)succinimide (commercially available from Aldrich Chemical Co., Milwaukee, Wis.), (15) 2,2,6,6-tetramethyl-4-piperidinyl/β-tetramethyl-3,9-(2,4,8,10-tetraoxo spiro(5,5)-undecane)diethyl-1,2,3,4-butane tetracarboxylate (commercially available from Fairmount), (16) N-(p-ethoxycarbonylphenyl)-N'-ethyl-N'-phenylformadine (commercially available from Givaudan), (17) 6-ethoxy-1,2-dihydro-2,2,4-trimethylquinoline (commercially available from Monsanto Chemicals), (18) 2,4,6-tris-(N-1,4-dimethylpentyl-4-phenylenediamino)-1,3,5-triazine (commercially available from Uniroyal), (19) 2-dodecyl-N-(2,2,6,6-tetramethyl-4-piperidinyl)succinimide (commercially available from Aldrich Chemical Co.), (20) N-(1-acetyl-2,2,6,6-tetramethyl-4-piperidinyl)-2-dodecyl succinimide (commercially available from Aldrich Chemical Co.), (21) (1,2,2,6,6-pentamethyl-4-piperidinyl/β-tetramethyl-3,9-(2,4,8,10-tetra oxo-spiro-(5,5)undecane)diethyl)-1,2,3,4-butane tetracarboxylate (commercially available from Fairmount), (22) (2,2,6,6-tetramethyl-4-piperidinyl)-1,2,3,4-butane tetracarboxylate (commercially available from Fairmount), (23) nickel dibutyl dithio carbamate (commercially available as UV-Chek AM-105 from Ferro), (24) 2-amino-2',5-dichlorobenzophenone (Aldrich 10,515-5), (25) 2'-amino-4',5'-dimethoxyacetophenone (Aldrich 32,922-3), (26) 2-benzyl-2-(dimethylamino)-4'-morpholino butyrophenone (Aldrich 40,564-7), (27) 4'-benzyloxy-2'-hydroxy-3'-methylacetophenone (Aldrich 29,884-0), (28) 4,4'-bis(diethylamino)benzophenone (Aldrich 16,032-6), (29) 5-chloro-2-hydroxy benzophenone (Aldrich C4,470-2), (30) 4'-piperazinoacetophenone (Aldrich 13,646-8), (31) 4'-piperidinoacetophenone (Aldrich 11,972-5), (32) 2-amino-5-chlorobenzophenone (Aldrich A4,556-4), (33) 3,6-bis(2-methyl-2-morpholinopropionyl)-9-octylcarbazole (Aldrich 46,073-7), and the like, as well as mixtures thereof.

Tackifiers.

The ink may also optionally include tackifiers, such as FORAL 85, a glycerol ester of hydrogenated abietic (rosin) acid (commercially available from Hercules), FORAL 105, a pentaerythritol ester of hydroabietic (rosin) acid (commercially available from Hercules), CELLOLYN 21, a hydroabietic (rosin) alcohol ester of phthalic acid (commercially available from Hercules), ARAXAWA KE-311 Resin, a triglyceride of hydrogenated abietic (rosin) acid (commercially available from Arakawa Chemical Industries, Ltd.), synthetic polyterpene resins such as NEVTAC 2300, NEVIAC 100, and NEVRAC 80 (commercially available from Neville Chemical Company), WINGTACK 86, a modified synthetic polyterpene resin (commercially available from Goodyear), and the like. The tackifier, when present, may be present in the ink in any desired or effective amount, such as at least about 0.1% by weight of the ink, at least about 5%, at least about 10%, or no more than about 50%, although the amount can be outside of these ranges.

Conductivity Enhancing Agents.

An optional conductivity enhancing agent may also be included. Many ink vehicles of solid inks have an electrical conductivity of essentially zero. Thus, conductivity enhancing agents may be added to the ink vehicle to provide consistent conductivity to the ink. The conductivity is used as an input signal for a level sensor in the ink reservoir of the ink jet device.

In embodiments, the conductivity enhancing agent may be an organic salt formed from an organic base and an acid. The organic base of the organic salt of the conductivity enhancing agent may be an organic amine and have at least one long hydrocarbon chain. "Long hydrocarbon chain" refers to, for example, a linear or branched carbon alkyl or aryl chain having from about 10 carbons to about 50 carbons, such as from about 15 to about 40 carbons or from about 15 carbons to about 30 carbons. The long carbon chain of the organic salt allows it to be miscible in the ink vehicle.

Unless otherwise required, the optional additives, when present may each, or in combination, be present in the ink in any desired or effective amount, such as from about 0.1% to about 10% by weight of the ink or from about 3% to about 5%.

In embodiments, the solid ink may also optionally contain other materials, which may depend upon the type of printer in which the ink is used. For example, the ink vehicle composition is typically designed for use in either a direct printing mode or an indirect or offset printing transfer system.

Ink Preparation

The ink compositions can be prepared by any desired or suitable methods. For example, the components of the ink vehicle can be mixed together, followed by heating the mixture to at least its melting point (for example from about 60° C. to about 150° C., about 80° C. to about 120° C., or about 85° C. to about 110° C.). The colorant may be added before the ink ingredients have been heated or after the ink ingredients have been heated. The molten mixture may be subjected to simple stir-mixing, high shear mixing, or grinding; for example, in a high shear mixer, in an extruder, in a media mill, in a ball mill, in a homogenizer, or in combinations of the apparatus, to effect dispersion of the pigment in the ink carrier to obtain a substantially stable, homogeneous, and uniform melt. The resulting melt can be further mixed, and subjected to further mixing or grinding, with other ink ingredients to fine tune its properties for a particular printing system. The resulting ink is then filtered at 120° C. and cooled to ambient temperature (typically from about 20° C. to about 25° C.). The inks are solid at ambient temperature. In an embodiment, during the formation process, the molten inks are poured into molds and then cooled to form solid ink sticks. Suitable ink preparation techniques are disclosed in U.S. Pat. No. 7,186, 762, the disclosure of which is incorporated herein by reference in its entirety.

In embodiments, the inks have a viscosity of from about 1 to about 40 centipoise (cP), such as from about 5 to about 15 cP or from about 8 to about 12 eP, at an elevated temperature suitable for ink jet printing, such as temperatures of from about 50° C. to about 150° C., from about 70° C. to about 130° C., or from about 80° C. to about 130° C. The inks may jet at lower temperatures and, thus, require lower amounts of energy for jetting. In this regard, the inks herein may be low energy inks. Low energy inks have a jetting viscosity of about 9 to about 13 cP, such as from about 10 to about 11 cP, from about 10.25 to about 10.75 cP or from about 10.45 to about 10.85 cP, at jetting temperatures of about 107° C. to about 111° C., although the viscosity and temperature values can be outside theses ranges.

In embodiments, the light-cyan solid ink when printed on paper has a mass of from about 0.1 to about 1.5 mg/cm$^2$, such as from about 0.4 to about 0.7 mg/cm$^2$.

The solid ink may contain any combination of elements, as long as it meets physical properties encompassed by this disclosure.

Image Forming and Inkjet Devices

Solid ink jet processes are well known and are described, for example, in U.S. Pat. Nos. 4,601,777, 4,251,824, 4,410, 899, 4,412,224 and 4,532,530, the disclosures of which are incorporated herein by reference in their entirety.

Printed images may be generated with the ink described herein by incorporating the ink into an inkjet device, for example a thermal inkjet device, an acoustic inkjet device, or a piezoelectric inkjet device, and concurrently causing droplets of the molten ink to be ejected in an imagewise manner onto a substrate. The ink is typically included in at least one reservoir connected by any suitable feeding device to the ejecting channels and orifices of the inkjet head for ejecting the ink. In the jetting procedure, the inkjet head may be heated, by any suitable method, to the jetting temperature of the inks. The reservoir(s) containing the solid ink may also include heating elements to heat the ink. The solid inks are thus transformed from the solid state to a molten state for jetting. "At least one or one or more," as used to describe components of the inkjet device, such as the ejecting channels, orifices, etc., refers to from 1 to about 2 million, such as from about 1000 to about 1.5 million or about 10,000 to about 1 million of any such component found in the inkjet device. "At least one" or "one or more" as used to describe other components of the inkjet device such as the inkjet head, reservoir, feeder, etc., refers to from 1 to about 15, such as from 1 to about 8 or from 1 to about 4 of any such component found in the inkjet device.

The inks can also be employed in indirect (offset) printing ink jet applications, wherein when droplets of the melted ink are ejected in an imagewise pattern onto a recording substrate, the recording substrate is an intermediate transfer member and the ink in the imagewise pattern is subsequently transferred from the intermediate transfer member to a final recording substrate. An offset or indirect printing process is also disclosed in, for example, U.S. Pat. No. 5,389,958, the disclosure of which is incorporated herein by reference. Examples of apparatuses that are suitable for printing the solid inks described herein include apparatuses comprised of at least one ink retaining reservoir to store or hold solid ink, an ink jet head for printing the ink, and an ink supply line for providing the solid ink to the ink jet head.

The ink can be jetted or transferred onto any suitable substrate or recording sheet to form an image including plain papers such as XEROX® 4200 papers, XEROX® Image Series papers, Courtland 4024 DP paper, ruled notebook paper, bond paper, and the like; silica coated papers such as Sharp Company silica coated paper, JuJo paper, HAMMERMILL LASERPRINT® paper, and the like; glossy coated papers such as XEROX® Digital Color Gloss, Sappi Warren Papers LUSTROGLOSS®, and the like; transparency materials; fabrics; textile products; plastics; polymeric films; inorganic substrates such as metals, ceramics, and wood; and the like.

The following examples of solid ink compositions further illustrate the foregoing embodiments. These Examples are illustrative of different compositions and conditions that can be utilized in practicing the disclosure. It will be apparent, however, that the disclosure can be practiced with many types of compositions and can have many different uses in accordance with the disclosure above and as pointed out hereinafter.

EXAMPLES

Example 1

Preparation of Ink Base

An ink base is prepared by mixing the following components by melting and homogeneously blending them together at 110° C. using an overhead stirrer: (1) 54.23 parts by weight distilled Polyethylene Wax from Baker Petrolite; (2) 15.43 parts by weight triamide wax ("triamide" is described in U.S. Pat. No. 6,860,930, the disclosure thereof incorporated herein by reference); (3) 15.64 parts by weight Kemamide S-180 (a stearyl stearamide) commercially available from Chemtura Corp.; (4) 12.52 parts by weight KE-100 resin, a triglycerides of hydrogenated abietic (rosin) acid, from Arakawa Chemical Industries, Ltd.; (5) 1.05 parts by weight of a urethane resin that is the adduct of three equivalents of stearyl isocyanate and a glycerol-based alcohol (prepared as described in Example 4 of U.S. Pat. No. 6,309,453, the disclosure thereof incorporated herein by reference); and (7) 0.21 parts by weight NAUGARD-445 (an antioxidant) available from Crompton Corp.

Example 2

Preparation of Light-Cyan Pigmented Ink Concentrate

A base solution for the preparation of the ink concentrate is prepared by adding 16.2 g SOLSPERSE 17000 to 130 g of the ink base prepared in Example 1. This is stirred for about 3 minutes at 120° C. and then charged to a Szegvari 01 attritor. The Szegvari 01 attritor, pre-heated to 120° C., is charged with 180.0 g ⅛" 440 C Grade 25 stainless steel balls that are preheated to 120° C. The attritor is allowed to equilibrate for 30 minutes at 120° C. while a colorant mixture of 16.2 g with a ratio as shown, for example, in Table 2 (below), is slowly added to the ink base with the attritor stirring at a tip speed of 65 ft/min. The pigmented mixture is then allowed to attrite overnight for 19 hours with a tip speed at 130 ft/min upon which the resultant free-flowing ink concentrate is discharged and separated from the steel balls in its molten state.

Example 3

Preparation of Light-Cyan Pigmented Ink

A light colored pigmented ink is made by adding 4.4 g of the pigmented ink concentrate from Example 2 to 118.9 g of the ink base of Example 1 with 0.22 g of SOLSPERSE 17000 in a 150 ml beaker kept inside the oven at 120° C. Stir the resulting mixed dispersion with a mechanical stirrer at 200 rpm for 30 min. at 120° C. The resulting pigmented ink is then filtered at 120° C. through a 1 μm glass fiber filter available commercially from Pall Corp. The shear rate viscosity is measured using an RFS3 rheometer from Rheometrics Scientific. Table 1 (below) shows the final ink composition.

TABLE 1

LIGHT-CYAN SOLID INK COMPOSITION

| Ink Vehicle Component | Wt % |
|---|---|
| Distilled Polyethylene Wax | 54.23 |
| S-180 (Stearyl Stearamide) | 15.64 |
| Triamide Component A | 15.43 |
| KE-100 | 10.11 |
| Urethane resin Component B | 0.85 |
| NAUGARD-445 | 0.17 |
| Colorant | Varies as in Table 2 |
| Solsperse 17000 | 0.55 |

In Examples 4-6, the processes outlined in Examples 1-3 are carried out, with each of the respective examples using a different colorant composition as outlined in Table 2 (below). Standard printing methods are used to prepare images using the light-cyan solid inks.

TABLE 2

LIGHT-CYAN SOLID INK COLORANT COMPOSITIONS

| Examples | Composition | Pigment Type | Pigment Loading (wt %) |
|---|---|---|---|
| 4 | Uncorrected | PB15:3 | 0.34 |
| 5 | A | PB15:3/PB61/R330 | 0.25/0.06/0.01 |
| 6 | B | PB15:3/PR122/PR269/R330 | 0.35/0.03/0.03/0.005 |

Example 4

Uncorrected Colorant

The processes outlined in Examples 1-3 are carried out with a reduced pigment load to produce a light-cyan solid ink. The uncorrected light-cyan ink contains 0.34 wt % Pigment Blue 15:3. When the resultant solid ink is used in printing, the image has a significantly large hue shift between the nominal and uncorrected light-cyan inks, easily detectable to the human eye.

Figure 2:
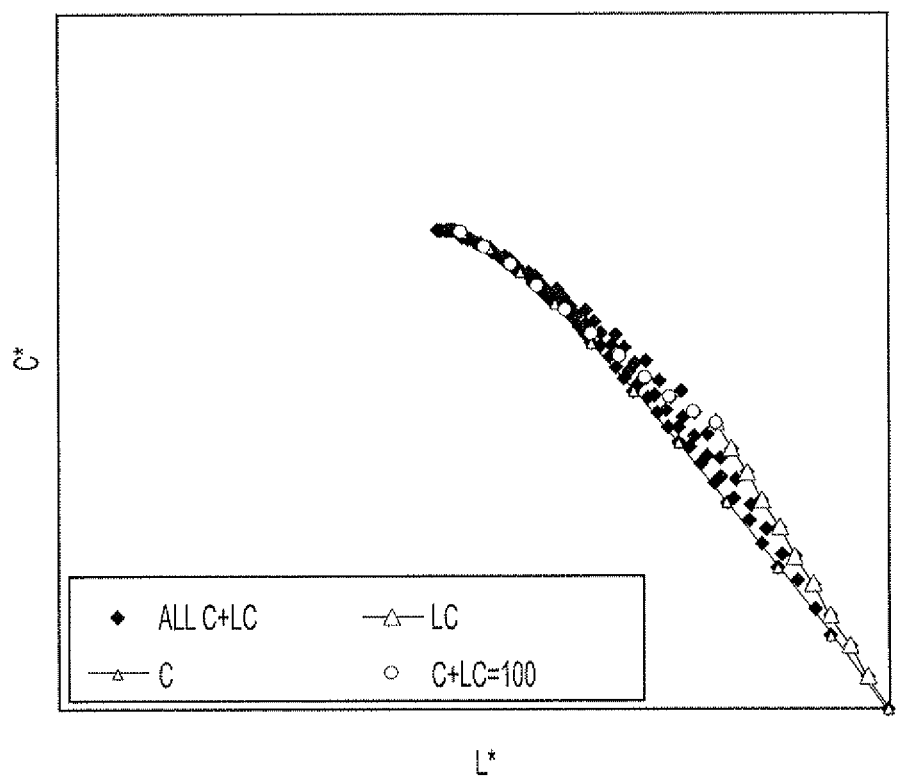
FIG. 2 is a graph of Chroma (C*) vs. Lightness (L*) illustrating the color difference between a light-cyan solid ink that is not hue corrected relative to the target halftone trajectory of the nominal cyan solid ink.

FIGS. 1 and 2 illustrate the hue shift and what happens to the color properties when the pigment loading is decreased to produce a light-cyan solid ink. FIG. 1, plotting $b^*$ vs. $a^*$, shows over an ink mass per unit area range how far off the uncorrected light-cyan (LC curve) is from the target halftone trajectory of the nominal cyan solid ink (C curve). In this instance, the targeted color is defined as 40% area coverage point on the halftone trajectory of a nominal cyan solid ink. This difference in color is due to a color change upon decreasing the pigment loading resulting in shifting the hue angle while producing a significant Delta E color difference from the target curve, which is easily detected by the human eye. FIG. 2, plotting Chroma vs. Lightness, shows the corresponding difference between the uncorrected light-cyan solid ink (LC curve) compared to the target trajectory (C curve).

Example 5

Colorant A

The processes outlined in Examples 1-3 are carried out with modified colorant A. Colorant A comprises 0.25 wt % Pigment Blue 15:3 with 0.06 wt % Pigment Blue 61 as a hue adjusting colorant and 0.01 wt % R330 carbon black as a shade adjusting colorant. When the resultant solid ink is used in printing, the image does not have a significant hue shift.

Example 6

Colorant B

The processes outlined in Examples 1-3 are carried out with modified colorant B. Colorant B comprises 0.35 wt % Pigment Blue 15:3, with 0.03 wt % Pigment Red 122 and 0.03 wt % Pigment Red 269 as hue adjusting colorants, and 0.005 wt % R330 carbon black as a shade adjusting colorant. When the resultant solid ink is used in printing, the image does not have a significant hue shift.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A light-cyan solid ink, comprising an ink vehicle that is solid at room temperature, a colorant, and optional additives, the colorant comprising:
   a cyan colorant,
   a hue-adjusting colorant that absorbs wavelengths of light within a range of about 500 to about 600 nm, and
   an optional shade-adjusting colorant that absorbs wavelengths of light within a range of about 400 to about 500 nm, wherein
   the light-cyan ink when printed at 100% halftone area coverage has substantially the same color as a nominal cyan ink when printed at a halftone area coverage value of from about 15% to about 70% halftone area coverage,
   the light-cyan ink, when 100% solid, has a lightness $L^*$ of about 10 to about 45 units above that of a nominal cyan ink at 100% solid,
   the cyan colorant is present in an amount of from about 0.05% to about 6% by weight of the ink,
   the hue-adjusting colorant is present in an amount of from about 0.001% by weight to about 1% by weight of the ink, and
   the shade-adjusting colorant, if present, is present in an amount of from about 0.001% by weight to about 0.6% by weight of the ink.

2. The solid ink of claim 1, further comprising the shade-adjusting colorant.

3. The solid ink of claim 2, wherein the shade-adjusting colorant comprises at least one colorant selected from the group consisting of Pigment Yellow 12, Pigment Yellow 17, Pigment Yellow 74, Pigment Yellow 83, Pigment Yellow 97, Pigment Yellow 139, Pigment Yellow 155, Pigment Yellow 180, Pigment Orange 2, Pigment Orange 5, Pigment Orange 38, Pigment Orange 64, Pigment Red 4, Pigment Red 38, Pigment Red 66, Pigment Red 119, Pigment Red 178, Carbon Black, Solvent Yellow 16, Solvent Yellow 93, Solvent Yellow 104, Solvent Yellow 163, Solvent Yellow 141, Solvent Red 111, Solvent Black 7, Solvent Black 27, and Solvent Black 45.

4. The solid ink of claim 1, wherein the cyan colorant absorbs wavelengths of light within a range of about 600 to about 700 nm.

5. The solid ink of claim 1, wherein the cyan colorant comprises at least one colorant selected from the group consisting of Pigment Blue 15:3, Pigment Blue 15:4, Pigment Blue 16, Solvent Blue 35, Solvent Blue 38, Solvent Blue 48, Solvent Blue 70, and Solvent Blue 101.

6. The solid ink of claim 1, wherein the hue-adjusting colorant comprises at least one colorant selected from the group consisting of Pigment Blue 61, Pigment Red 57:1, Pigment Red 81:2, Pigment Red 122, Pigment Red 184, Pigment Red 185, Pigment Red 238, Pigment Red 269, Solvent Red 49, Solvent Red 52, Solvent Red 151, Solvent Red 155, Solvent Red 172, Solvent Violet 13, Solvent Blue 97, Solvent Blue 102, Solvent Blue 104, and Solvent Blue 128.

7. The solid ink of claim 1, wherein the ink exhibits a light-cyan color.

8. The solid ink of claim 1, wherein the hue-adjusting colorant substantially absorbs wavelengths of light within the range of about 400 to about 500 nm.

9. A method of making a light-cyan solid ink, comprising:
   mixing an ink vehicle and a colorant, the colorant comprising:
      a cyan colorant,
      a hue-adjusting colorant that absorbs wavelengths of light within a range of about 500 to about 600 nm, and
      an optional shade-adjusting colorant that absorbs wavelengths of light within a range of about 400 to about 500 nm;
   heating the mixture; and
   cooling the heated mixture to form a solid ink, wherein
   the light-cyan ink when printed at 100% halftone area coverage has substantially the same color as a nominal cyan ink when printed at a halftone area coverage value of from about 15% to about 70% halftone area coverage,
   the light-cyan ink, when 100% solid, has a lightness $L^*$ of about 10 to about 45 units above that of a nominal cyan ink at 100% solid,
   the cyan colorant is present in an amount of from about 0.05% to about 6% by weight of the ink,
   the hue-adjusting colorant is present in an amount of from about 0.001% by weight to about 1% by weight of the ink, and
   the shade-adjusting colorant, if present, is present in an amount of from about 0.001% by weight to about 0.6% by weight of the ink.

10. The method of claim 9, wherein the mixture comprises the shade-adjusting colorant.

11. The method of claim 9, wherein the mixture is heated to at least the melting point of the ink vehicle.

12. A method of forming an image, comprising:
    printing with solid inks an image on a substrate,
    wherein:
       the solid inks comprise at least a cyan ink, a magenta ink, a yellow ink, and a light-cyan ink, and
       the light-cyan ink comprises an ink vehicle and a colorant, the colorant comprising:
          a cyan colorant,
          a hue-adjusting colorant that absorbs wavelengths of light within a range of about 500 to about 600 nm, and
          an optional a shade-adjusting colorant that absorbs wavelengths of light within a range of about 400 to about 500 nm, wherein
    the light-cyan ink when printed at 100% halftone area coverage has substantially the same color as a nominal cyan ink when printed at a halftone area coverage value of from about 15% to about 70% halftone area coverage,
    the light-cyan ink, when at 100% solid, has a lightness $L^*$ of about 10 to about 45 units above that of a nominal cyan ink at 100% solid,
    the cyan colorant is present in an amount of from about 0.05% to about 6% by weight of the ink,
    the hue-adjusting colorant is present in an amount of from about 0.001% by weight to about 1% by weight of the ink, and
    the shade-adjusting colorant, if present, is present in an amount of from about 0.001% by weight to about 0.6% by weight of the ink.

13. The method of claim 12, wherein the light-cyan ink comprises the shade-adjusting colorant.

* * * * *